Aug. 10, 1965 F. W. SCHAAF 3,199,446

OVERPRINTING APPARATUS FOR PRINTING A CHARACTER AND AN ACCENT

Filed Sept. 7, 1962 6 Sheets-Sheet 1

INVENTOR
FRED W. SCHAAF

BY Francis V. Giolma

ATTORNEY

Aug. 10, 1965 F. W. SCHAAF 3,199,446

OVERPRINTING APPARATUS FOR PRINTING A CHARACTER AND AN ACCENT

Filed Sept. 7, 1962 6 Sheets-Sheet 2

| K \ V | I | | II | | III | | IV | | V | |
|---|---|---|---|---|---|---|---|---|---|---|
| 1 | a | ア | i | イ | u | ウ | e | エ | o | オ |
| 2 | ka | カ | ki | キ | ku | ク | ke | ケ | ko | コ |
| 2" | ga | ガ | gi | ギ | gu | グ | ge | ゲ | go | ゴ |
| 3 | sa | サ | shi | シ | su | ス | se | セ | so | ソ |
| 3" | zu | ザ | ji | ジ | zu | ズ | ze | ゼ | zo | ゾ |
| 4 | ta | タ | chi | チ | tsu | ツ | te | テ | to | ト |
| 4" | da | ダ | ji | ヂ | zu | ヅ | de | デ | do | ド |
| 5 | na | ナ | ni | ニ | nu | ヌ | ne | ネ | no | ノ |
| 6 | ha | ハ | hi | ヒ | hu | フ | he | ヘ | ho | ホ |
| 6" | ba | バ | bi | ビ | bu | ブ | be | ベ | bo | ボ |
| 6° | pa | パ | pi | ピ | pu | プ | pe | ペ | po | ホ |

FIG. 6

Aug. 10, 1965 F. W. SCHAAF 3,199,446

OVERPRINTING APPARATUS FOR PRINTING A CHARACTER AND AN ACCENT

Filed Sept. 7, 1962 6 Sheets-Sheet 6

| ORDER NUMBER | 1 | 2 | 4 | 8 | A | B | K 1 | K 2 | K 4 | CHARACTER | ORDER NUMBER | 1 | 2 | 4 | 8 | A | B | K 1 | K 2 | K 4 | CHARACTER |
|---|---|---|---|---|---|---|---|---|---|---|---|---|---|---|---|---|---|---|---|---|---|
| 1 | ▨ | | | | | | | | | 1 | 49 | ▨ | | | | | | ▨ | | | ゛ |
| 2 | | ▨ | | | | | | | | 2 | 50 | | ▨ | | | | | ▨ | | | ラ |
| 3 | ▨ | ▨ | | | | | | | | 3 | 51 | ▨ | ▨ | | | | | ▨ | | | リ |
| 4 | | | ▨ | | | | | | | 4 | 52 | | | ▨ | | | | ▨ | | | ル |
| 5 | ▨ | | ▨ | | | | | | | 5 | 53 | ▨ | | ▨ | | | | ▨ | | | レ |
| 6 | | ▨ | ▨ | | | | | | | 6 | 54 | | ▨ | ▨ | | | | ▨ | | | ロ |
| 7 | ▨ | ▨ | ▨ | | | | | | | 7 | 55 | ▨ | ▨ | ▨ | | | | ▨ | | | ワ |
| 8 | | | | ▨ | | | | | | 8 | 56 | | | | ▨ | | | ▨ | | | ヲ |
| 9 | ▨ | | | ▨ | | | | | | 9 | 57 | ▨ | | | ▨ | | | ▨ | | | ッ |
| 10 | | ▨ | | ▨ | | | | | | 0 | 58 | | ▨ | | ▨ | | | ▨ | | | ヨ |
| 11 | ▨ | ▨ | | ▨ | | | | | | # | 59 | ▨ | ▨ | | ▨ | | | ▨ | ▨ | | コ |
| 12 | | | ▨ | ▨ | | | | | | @ | 60 | | | ▨ | ▨ | | | ▨ | ▨ | | サ |
| 13 | ▨ | | | | ▨ | | | | | / | 61 | ▨ | | | | ▨ | | ▨ | ▨ | | キ |
| 14 | | ▨ | | | ▨ | | | | | S | 62 | | ▨ | | | ▨ | | ▨ | ▨ | ▨ | ホ |
| 15 | ▨ | ▨ | | | ▨ | | | | | T | 63 | ▨ | ▨ | | | ▨ | | ▨ | | | マ |
| 16 | | | ▨ | | ▨ | | | | | U | 64 | | | ▨ | | ▨ | | ▨ | | | ミ |
| 17 | ▨ | | ▨ | | ▨ | | | | | V | 65 | ▨ | | ▨ | | ▨ | | ▨ | | | ム |
| 18 | | ▨ | ▨ | | ▨ | | | | | W | 66 | | ▨ | ▨ | | ▨ | | ▨ | | | メ |
| 19 | ▨ | ▨ | ▨ | | ▨ | | | | | X | 67 | ▨ | ▨ | ▨ | | ▨ | | ▨ | | | モ |
| 20 | | | | ▨ | ▨ | | | | | Y | 68 | | | | ▨ | ▨ | | ▨ | | | ヤ |
| 21 | ▨ | | | ▨ | ▨ | | | | | Z | 69 | ▨ | | | ▨ | ▨ | | ▨ | | | ユ |
| 22 | | ▨ | | ▨ | ▨ | | | | | ≠ | 70 | | ▨ | | ▨ | ▨ | | ▨ | | | ゜ |
| 23 | ▨ | ▨ | | ▨ | ▨ | | | | | , | 71 | ▨ | ▨ | | ▨ | ▨ | | ▨ | ▨ | | ク |
| 24 | | | ▨ | ▨ | ▨ | | | | | % | 72 | | | ▨ | ▨ | ▨ | | ▨ | ▨ | | ケ |
| 25 | ▨ | | | | | ▨ | | | | J | 73 | ▨ | | | | | ▨ | ▨ | | | ナ |
| 26 | | ▨ | | | | ▨ | | | | K | 74 | | ▨ | | | | ▨ | ▨ | | | ニ |
| 27 | ▨ | ▨ | | | | ▨ | | | | L | 75 | ▨ | ▨ | | | | ▨ | ▨ | | | ヌ |
| 28 | | | ▨ | | | ▨ | | | | M | 76 | | | ▨ | | | ▨ | ▨ | | | ネ |
| 29 | ▨ | | ▨ | | | ▨ | | | | N | 77 | ▨ | | ▨ | | | ▨ | ▨ | | | ノ |
| 30 | | ▨ | ▨ | | | ▨ | | | | O | 78 | | ▨ | ▨ | | | ▨ | ▨ | ▨ | ▨ | ハ |
| 31 | ▨ | ▨ | ▨ | | | ▨ | | | | P | 79 | ▨ | ▨ | ▨ | | | ▨ | ▨ | ▨ | ▨ | ヒ |
| 32 | | | | ▨ | | ▨ | | | | Q | 80 | | | | ▨ | | ▨ | ▨ | ▨ | ▨ | フ |
| 33 | ▨ | | | ▨ | | ▨ | | | | R | 81 | ▨ | | | ▨ | | ▨ | ▨ | ▨ | ▨ | ヘ |
| 34 | | ▨ | | ▨ | | ▨ | | | | — | 82 | | ▨ | | ▨ | | ▨ | ▨ | ▨ | | カ |
| 35 | ▨ | ▨ | | ▨ | | ▨ | | | | ¥ | 83 | ▨ | ▨ | | ▨ | | ▨ | ▨ | | | エ |
| 36 | | | ▨ | ▨ | | ▨ | | | | * | 84 | | | ▨ | ▨ | | ▨ | ▨ | | | オ |
| 37 | ▨ | | | | ▨ | ▨ | | | | A | 85 | ▨ | | | | ▨ | ▨ | ▨ | ▨ | | シ |
| 38 | | ▨ | | | ▨ | ▨ | | | | B | 86 | | ▨ | | | ▨ | ▨ | ▨ | ▨ | | ス |
| 39 | ▨ | ▨ | | | ▨ | ▨ | | | | C | 87 | ▨ | ▨ | | | ▨ | ▨ | ▨ | ▨ | | セ |
| 40 | | | ▨ | | ▨ | ▨ | | | | D | 88 | | | ▨ | | ▨ | ▨ | ▨ | ▨ | | ソ |
| 41 | ▨ | | ▨ | | ▨ | ▨ | | | | E | 89 | ▨ | | ▨ | | ▨ | ▨ | ▨ | ▨ | | タ |
| 42 | | ▨ | ▨ | | ▨ | ▨ | | | | F | 90 | | ▨ | ▨ | | ▨ | ▨ | ▨ | ▨ | | チ |
| 43 | ▨ | ▨ | ▨ | | ▨ | ▨ | | | | G | 91 | ▨ | ▨ | ▨ | | ▨ | ▨ | ▨ | ▨ | | ツ |
| 44 | | | | ▨ | ▨ | ▨ | | | | H | 92 | | | | ▨ | ▨ | ▨ | ▨ | ▨ | | テ |
| 45 | ▨ | | | ▨ | ▨ | ▨ | | | | I | 93 | ▨ | | | ▨ | ▨ | ▨ | ▨ | ▨ | | ト |
| 46 | | ▨ | | ▨ | ▨ | ▨ | | | | & | 94 | | ▨ | | ▨ | ▨ | ▨ | ▨ | | | ウ |
| 47 | ▨ | ▨ | | ▨ | ▨ | ▨ | | | | · | 95 | ▨ | ▨ | | ▨ | ▨ | ▨ | ▨ | | | ア |
| 48 | | | ▨ | ▨ | ▨ | ▨ | | | | ⌑ | 96 | | | ▨ | ▨ | ▨ | ▨ | ▨ | | | イ |

FIG. 7

3,199,446
Patented Aug. 10, 1965

3,199,446

OVERPRINTING APPARATUS FOR PRINTING A CHARACTER AND AN ACCENT

Fred W. Schaaf, Apalachin, N.Y., assignor to International Business Machines Corporation, New York, N.Y., a corporation of New York Filed Sept. 7, 1962, Ser. No. 222,087
7 Claims. (Cl. 101—93)

This invention relates generally to printing and it has reference in particular to apparatus for printing by means of overprinting.

Generally stated, it is an object of this invention to provide for printing characters and the like on a chain printer by overprinting.

More specifically, it is an object of this invention to provide for storing separately indications of a character for each of a plurality of print positions and also one or more accents to be printed with different ones of said characters.

It is also an object of this invention to provide for storing separate indications of a plurality of character and accent segments in different storage positions and combining different ones of said character and accent segments by simultaneously scanning said positions for a comparison with a character or accent segment representation on a movable character and accent segment bearing member.

Yet another object of the invention is to provide for using a ring for loading sequential character and accent information into separate portions of a storage matrix and for stopping the ring each time accent information is detected so that the accent information is loaded into an accent storage plane in a position corresponding to the position of an associated character.

Another object of the invention is to provide for loading sequential accent and character information into corresponding positions in separate main character and accent storage planes and for simultaneously scanning both planes for a compare with a character or accent on a moving chain so that a hammer for one position having an accented character is fired twice in a single line printing operation to separately produce the accent and the character for said one position by overprinting.

Still another object of this invention is to provide in a chain printer for utilizing logic circuitry to separate sequential accent and character information so as to store accent indications in separate core planes in positions corresponding to the positions of the character information with which they are used.

A further object of this invention is to provide for separately storing indications of characters and accents in corresponding positions in different storage planes, simultaneously scanning corresponding positions of the character and accent planes for a compare with a character or accent on a moving chain at the corresponding print position and inhibiting regeneration of accent bits each time a compare occurs so that the accent plane contains only zeros at the end of a complete line printing operation.

Another object of this invention is to provide for automatically printing characters in response to coded information by overprinting through the use of separate type segments which together form a complete character.

Yet a different object of the invention is to provide for operating a printer in response to coded information for printing characters which comprise separate portions, by overprinting from separate type segments corresponding to different portions of the character in succeeding operations.

The foregoing and other objects, features and advantages of the invention will be apparent from the following more particular description of a preferred embodiment of the invention as illustrated in the accompanying drawings.

In the drawings:

FIG. 6 is a table showing typical Katakana characters with and without accents and FIG. 7 is a table showing an arrangement of codes for alphabetic, numeric and Katakana characters and accents such as may be used with the system described and shown in the foregoing figures.

Figure 1:
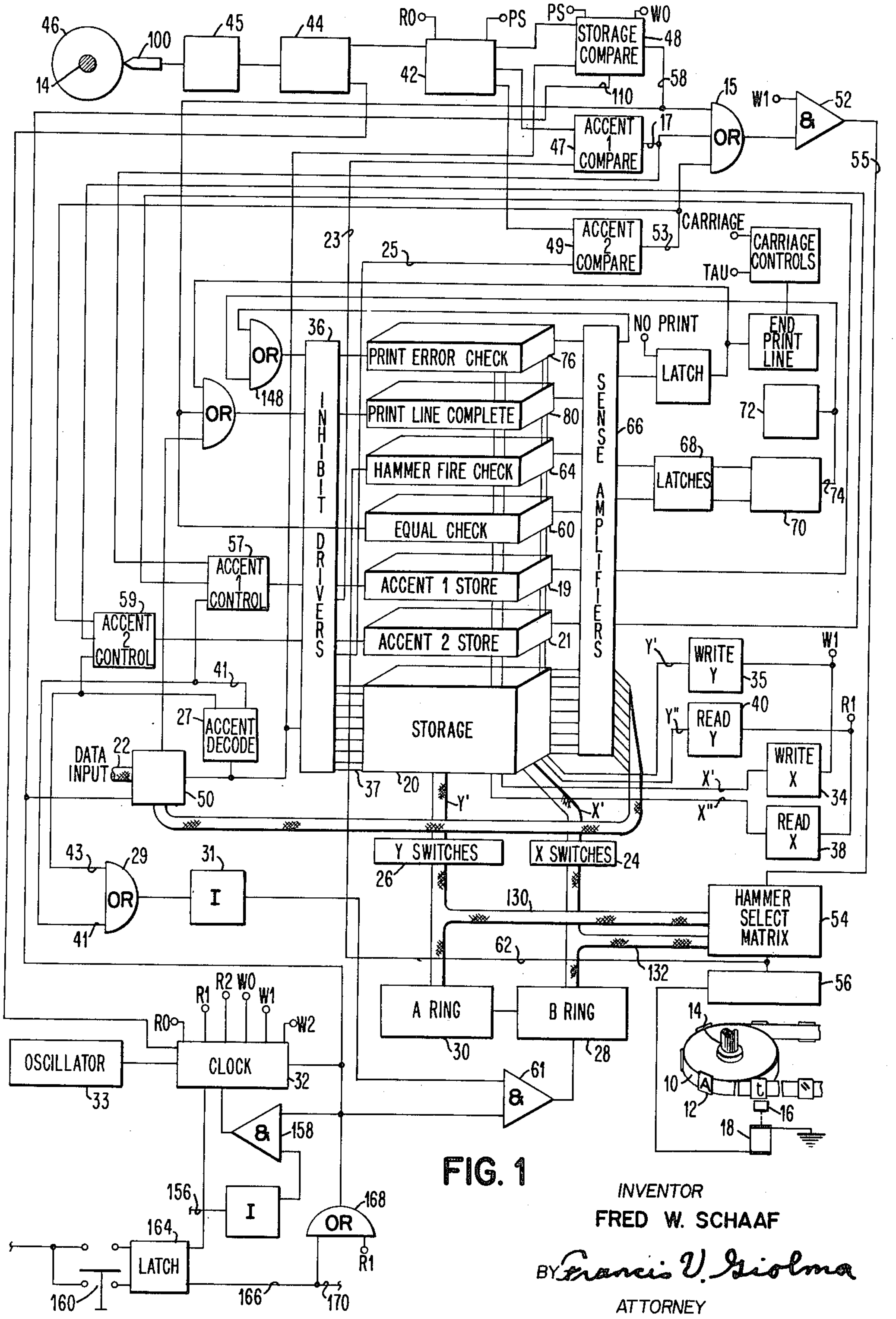
FIG. 1 is a schematic block diagram illustrating generally typical circuit arrangements of a chain printer embodying the invention in one of its forms.

In each of the drawings of the various circuits, many of the individual components or units making up the circuit are generally indicated merely as a box or the like. The specific circuitry of such boxes will not generally be described as applied to any specific form of transistor, tube or diode circuit. A detailed description of typical diode coincidence switches, diode mixers, inverters, single and double latches along with cathode followers, power tubes and the like where required is shown and described in the patent of F. E. Hamilton et al., No. 2,959,351 which issued on November 8, 1960 and is assigned to the assignee of the present invention.

For the purpose of this description a typical coincidence switch shown as a triangle and otherwise known as a logical AND circuit or diode switch, comprises usually diodes or the like, not shown, each including an individual input terminal normally biased negative so that the common terminal is at a negative potential with respect to ground. If coincident positive pulses are applied to all input terminals, the potential of the output terminal is raised; however, if only one of the input terminals, or less than all of the input terminals, is pulsed positively the potential of the common output terminal is not raised appreciably. Any suitable voltage responsive device may be controlled by the potential of the output terminal to furnish a usable output voltage level whenever a coincidence of positive input pulses is detected.

A typical mix, otherwise known as a logical OR circuit or diode mix may also comprise diodes, tubes or the like. In the present drawings to distinguish diode mixes from diode switches, the former are shown as a semicircle. Any suitable voltage responsive device may be controlled by the potential of a common output terminal of the diode mix. This terminal is connected by a suitable resistor to a negative voltage source not shown and maintains a negative bias on the related diode or tube. Each diode is connected to an input terminal which in turn is connected in the electrical circuit. If any one or all of the diode input terminals are raised, the potential of the output terminal is raised, which permits the tube or the like associated therewith to conduct or operate in a predetermined manner.

While cathode followers, inverters or the like are not always shown in detail, it is to be understood that various types may be utilized in different locations, and the circuits may involve various resistance values and capacity couplings to produce the desired outputs. Since the particular structures of the cathode followers, inverters, triggers and the like are not a part of the present invention, a detailed description of each type is not deemed necessary. Likewise in the drawings all semiconductors, power tubes, inverters, double inverters and the like which would normally be required to maintain the proper signal level have for the purposes of simplicity been shown only in block form or eliminated. Also for the sake of simplicity, details of the necessary well known types of driving rings, latches and triggers have been eliminated. Generally, a single latch comprises a double inverter and a cathode follower which respond when the input signal raises the output of the cathode follower which in turn supplies the desired signal and has a feedback leading to the input to maintain the cathode follower conducting. A more detailed explanation is provided in the above Hamilton et al. patent, and apparatus of this type is is shown and claimed in the patent to E. S. Hughes, Jr., No. 2,628,309 which issued on February 10, 1953.

*General description*

As shown in FIG. 1, a printer of a general type such as described in the Patent No. 3,066,601 of Harold E. Eden, Serial No. 862,534, filed December 29, 1959 (IBM Docket 6224) and the patents of F. M. Demer et al., No. 2,990,767, entitled "Improved Chain Printer" issued July 4, 1961, and E. R. Wooding, No. 2,918,865, issued December 29, 1959, entitled "Chain Printer Timer" and also further described in the patent of F. M. Demer et al., No. 2,993,437, entitled "High Speed Printer Apparatus," issued July 25, 1961, may comprise a movable chain 10 having a plurality of character or character segment bearing type members 12 thereon and rotatably supported by means such as a shaft 14 to move past a plurality of side-by-side print positions, each having a print hammer 16 actuated by a solenoid 18 for marking a paper (not shown) or the like inserted between the hammer and the chain.

Incoming information to be printed arrives over a data input line 22 parallel by bit, serial by character. Most of the characters which may be alphabetic, numeric or special, such as shown in FIG. 7, are designated by a single group of bits and may be printed by a print hammer in a single operation. Other characters may be formed by imprints from two or more type segments or portions which are located separately on the chain 10 and are printed at different times by a single print hammer in different operations on the hammer. For example, in Katakana, which is used to write foreign languages such as Japanese, Chinese etc. phonetically, there are characters such as (*t*) shown on the chain 10 in FIG. 1 and in the table of FIG. 6, which may be printed alone, along with a character segment such as an accent 1(\\) or with an accent 2(°). The character and accent segments each appear on the chain separately and are combined by separate printing operations of the different segments. The incoming information over data line 22 contains the accent and character code information separately, the accent information for an accented character appearing immediately preceding or ahead of the coded information bits for its associated character.

Information to be printed in the different print positions by the hammers 16 is stored in a main or principal memory core storage matrix 20, and accent 1 and accent 2 core storage planes 19 and 21. Matrix 20 has nine core planes, one for each bit of the nine bit code comprising for example the 1, 2, 4, 8, A, B, K1, K2 and K4 bits, each plane comprising fourteen rows of cores with ten cores in each row, core planes 19 and 21 each comprise a single plane of 140 cores similarly arranged. The information is written into different positions of the core storage 20 and accent storage 19 and 21 from data input channel 22 under the control of a plurality of X switches 24 and Y switches 26 which selectively energize different ones of a plurality of X' lines and Y' lines passing through the cores in the different planes to scan and sequentially select different core positions in the planes under the control of B and A memory rings 28 and 30, respectively, in a manner well known in the art. A clock 32 and an oscillator 33 are utilized to effect stepping of the rings 28 and 30, the clock 32 controlling the B or units ring, and the B ring controlling the A ring. The read-in or writing operation is completed by operating X and Y write drivers 34 and 35 in response to a W1 clock signal and a read-in signal. Inhibit latches 50 which are energized or set by clock pulse R0, and are selectively reset in response to data input over the channel 22, selectively control through core drivers 36, inhibit lines 37, opposing the write lines to determine in accordance with the incoming data whether a "1" is written into a core position when the X and Y lines are energized.

In order to coordinate writing of a character and an associated accent into storage, the output of an accent decode circuit 27 is utilized with an OR circuit 29 and inverter 31 whenever an accent 1 or accent 2 code is detected over input lines 22, in conjunction with AND circuit 61 and the clock pulse to block the advance of the A and B rings. A "1" is written into the respective print position of the particular accent core plane in response to an accent code and on the next clock pulse the rings do not advance, so the following character bits associated with the accent are written into the corresponding cores for the same print position of the principal or main character storage planes 20. For successive nonaccented characters, the clock advances the rings and each print position is scanned in turn.

Readout of information from core storage 20 and the accent storage 19 and 21 for printing is effected in a similar manner by successively scanning the different core positions of accent and character storage simultaneously under the control of X and Y switches by energizing the X'' and Y'' read lines passing through the cores, in the opposite sense to the write lines X' and Y', through operation of X and Y read drivers 38 and 40 in response to a clock signal R1 and a print scan signal. In order to determine which print position has a character or accent opposite it or in print position corresponding to the character or character and accent in storage, a compare counter 42 is utilized which is operated by a pulse scan counter 44 through control means 45 in response to pulses produced by a magentic drum 46 which is driven in accordance with the shaft 14 for producing at all times an indication of a character or accent segment on the chain 10 in a particular print position. The output of the compare counter is fed into compare circuits 47, 48 and 49 for accent 1, a normal character, and accent 2 respectively, and compared in response to a print scan signal and clock signal W0 with the output from an input and regeneration circuit 50 for the normal character in storage, and with the outputs from accent planes 19 and 21 for accents, so as to successively scan each print position for an accent or a character in storage as the rings 28 and 30 advance. Upon an equal comparison from any of compare circuits 47, 48 or 49, a signal is fed through an OR circuit 15 and AND circuit 52 with a clock pulse W1 to apply an equal signal to a hammer selecting matrix 54 over line 55 for enabling operation of a hammer actuating mechanism 56 to fire the eligible hammer 16 under the control of the same X and Y switches which select the core storage position.

At the same time the signal from the compare 48, for example, enables the firing of a hammer 16, this signal is also applied over line 58 to an equal check core plane 60 to reset the corresponding core to zero, each of the cores in this plane having been previously set to a "1" during the R portion of the cycle. When the particular hammer selected is fired, an impulse is directed over the line 62 to the corresponding core in a hammer fire check core plane 64 to set it to a "1." An error check scan is made on the next print scan cycle when the particular storage position is again interrogated and the outputs of these two cores are fed through sense amplifiers 66 and latches 68 to a compare error circuit 70 so that if an equal condition exists, an error signal will be produced and turn on a compare error stop latch 72 and apply a signal over line 74 to set the corresponding core in a print error check core plane 76. A print line complete core check plane 80 is provided having cores which are set to "0" for each equal compare signal from the circuit 48 as the particular print position is scanned, having been originally set to a "1" in response to energization of the X and Y lines upon writing the information into core storage 20. At the end of a complete line of printing, all the cores in the print line complete plane should be set to "0" and a check of this core plane will produce an error signal if this condition does not exist.

Whenever during a print scan a compare occurs in compare circuit 47 or 49, between an accent 1 or an accent 2 on the chain and a "1" in either of the accent planes 19 and 21 for a particular print position, the compare signal is used in addition to firing the respective print hammer, to prevent regeneration of a "1" in the particular position of the accent plane so that at the end of the print cycle, all the print positions in the accent planes should contain a "0." These cores are scanned during the extra print cycle along with the print line complete plane and the presence of a "1" in any core indicates an error.

Figure 5:
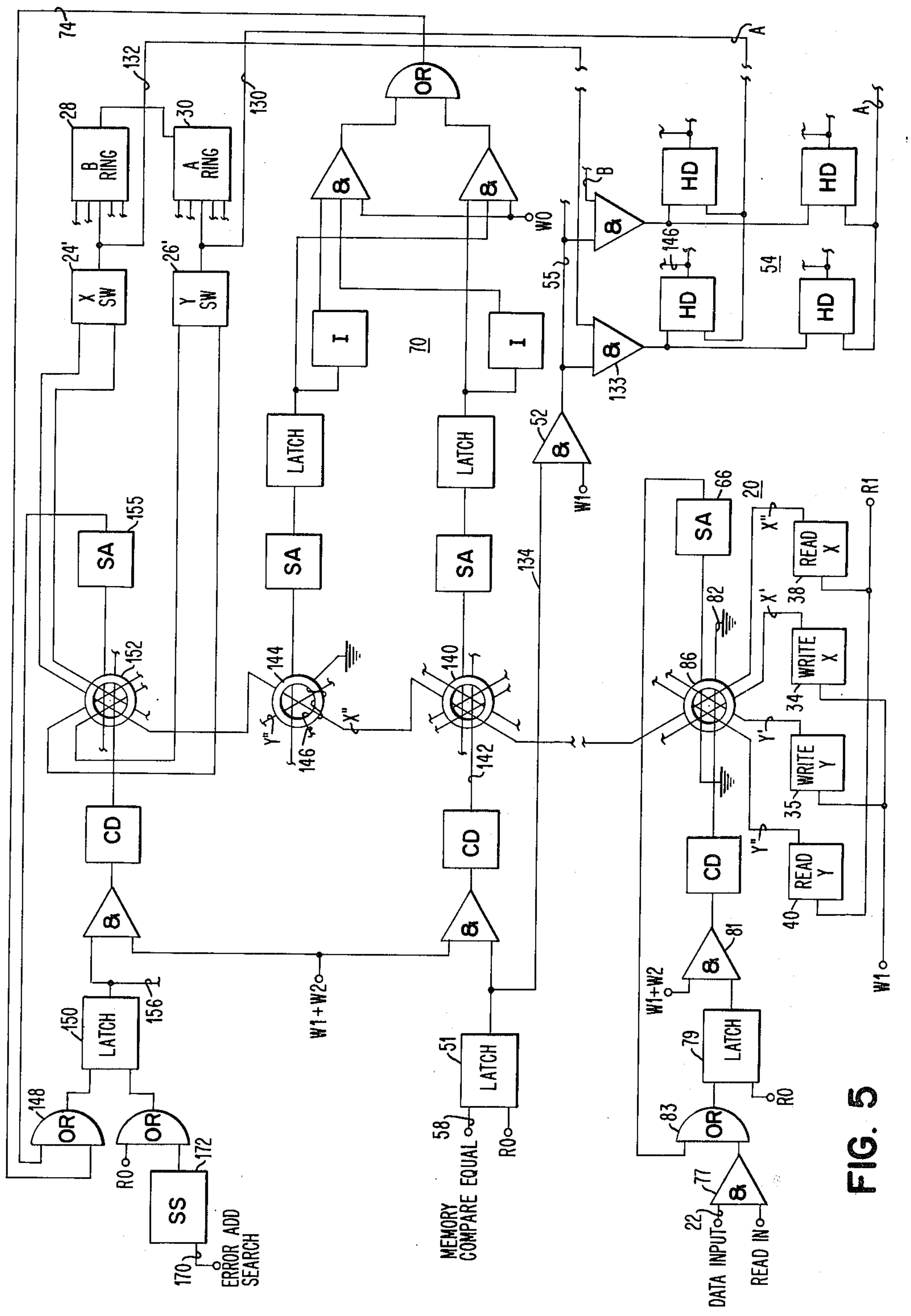
FIG. 5 is a schematic diagram of a further portion of the circuitry shown in FIG. 1 showing in further detail portions of the print check error circuit, the hammer fire circuit and the equal check compare circuit and core storage circuit.

Referring to FIGS. 1 and 5, it will be seen that data will be fed into the core storage 20 over the input channel 22 with the bits of information for a typical one of the nine core planes gating in an AND circuit 77 in conjunction with a read-in signal and then through an OR switch 83 to an input and regeneration latch 79 for the particular core plane comprising a portion of the input and regeneration circuit 50 of FIG. 1. The latch 79 will be set by a clock pulse at R0, and the output sampled in AND switch 81 by clock pulses W1 and W2 for energizing the inhibit winding or line 82 to oppose the effect of X and Y write drivers 34 and 35. Receipt of a data input signal over channel 22 resets the latch 79 so as to deenergize the inhibit line 82 and permit energization of the X' and Y' write lines to set the core 86 and write a "1." The write drivers 34 and 35 are turned on by the clock pulse W1, the particular core 86 being selected by the energization of its corresponding X and Y switches 24' and 26' in response to operation of the B and A rings 28 and 30. Each position of the core storage 20 is selected in sequence by the A and B rings in a similar manner and information is written into the core in response to corresponding bits over channel 22.

Figure 3:
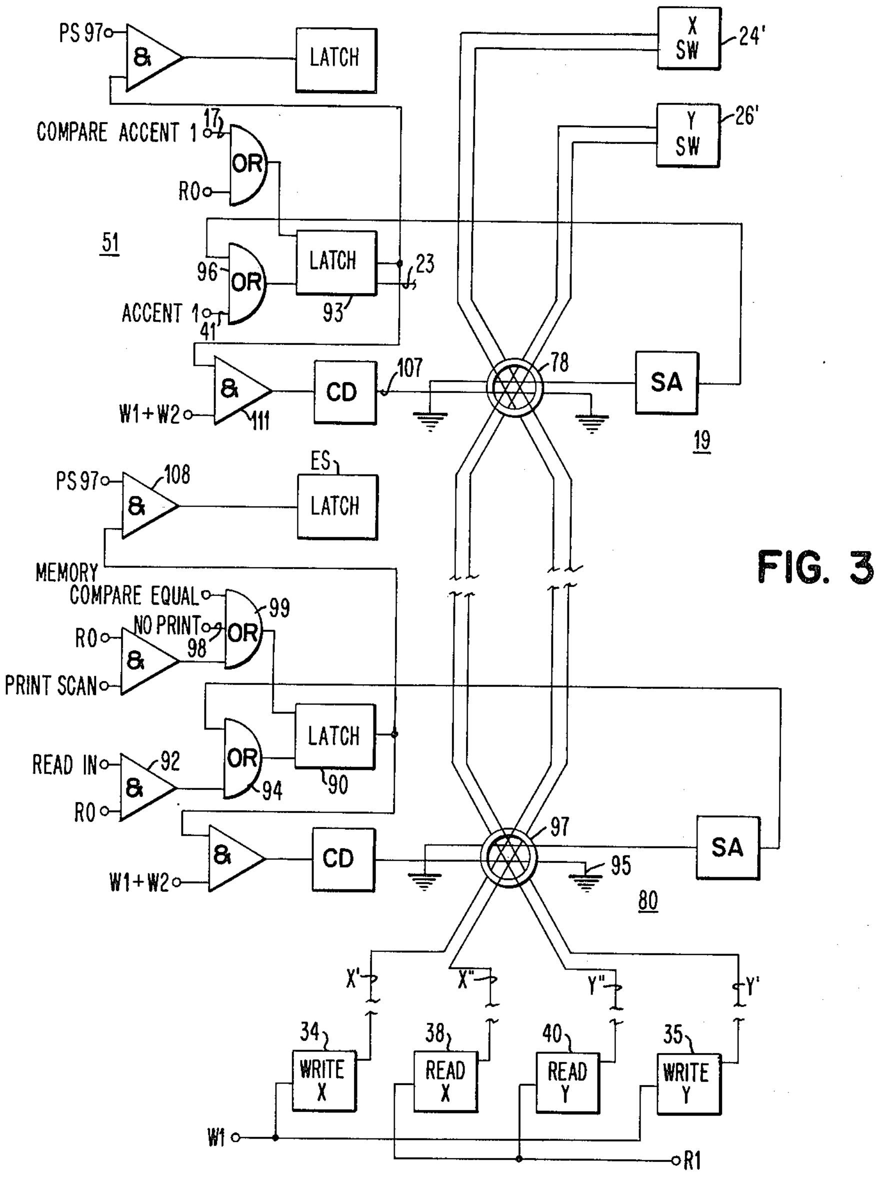
FIG. 3 is a schematic diagram of a portion of the circuit of FIG. 1 showing further details of the print line complete check circuitry and the accent storage circuitry.

Upon read-in to or writing into the core storage memory 20, each position of the print line complete check plane 80 will be set to the "1" state if there is a character to be printed in that position. This is accomplished as shown in FIG. 3 by resetting a print line complete latch 90 in response to a read-in signal and a R0 clock pulse which gates an AND circuit 92 and resets the latch 90 through OR circuit 94. This in conjunction with W1 and W2 pulses prevents energization of inhibit line 95 so that energization of X and Y write lines, X' and Y' when the write drivers 34, 35 are turned on and their respective switches 26' and 24' are selected by B and A rings 28 and 30 to write information into storage, sets a typical core 97 to "1" for each position in which there is a character to be written. If there is an invalid character a no print signal applied to the line 98 sets the print line complete latch 90 through OR circuit 99 and effects energization of the inhibit line 95 so as to prevent setting the core 97 to a "1" for the position in which there is no valid character.

As shown in FIG. 3, core 78 represents a typical core in the accent 1 plane 19. It is arranged to be driven by X' and Y' write lines as well as the X'' and Y'' read lines under the control of drivers 34, 35, 38 and 40 in conjunction with selection switches 24' and 26' in a manner similar to the selection of the other cores as hereinbefore described Accent decode logic 27 shown in FIG. 1 and comprising, for example, decode AND circuits such as AND circuits 119 and 121 produces outputs each time an accent 1 or accent 2 code appears over the input lines 22. This signal is fed over lines 41 and 43 to OR 29, inverter 31 and through AND 61 for controlling the B and A rings 28 and 30 so that the clock 32 cannot alone advance the rings when an accent code appears over the input lines 22. This enables the following character to be written in the same print position of the storage 20, after which the rings advance to the next print position in the usual manner. The regeneration of a bit in core 78 upon readout is controlled by inhibit latch 93 which is set by R0 or compare accent 1 signal from line 17 of FIG. 1, and is reset by readout from its sense amplifier or by the accent 1 signal from accent decode 27 over line 41 through OR 96. When reset, as by an accent 1 signal, the latch output to AND 111 is down and the inhibit line 107 is ineffective to prevent writing in a "1." When set by an accent compare signal upon readout, the output is up, and inhibit line 107 prevents a "1" being rewritten in core 78.

Figure 2:
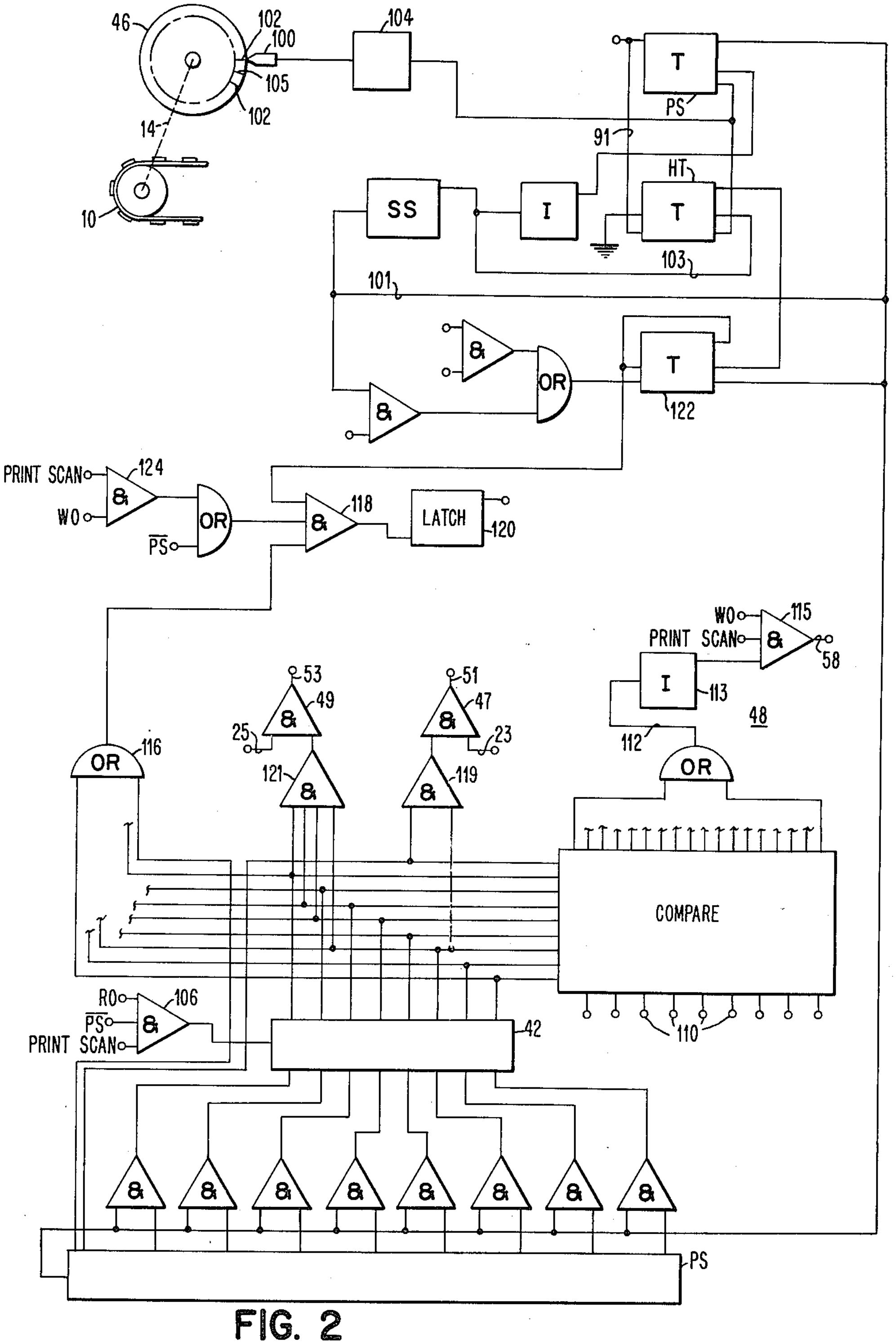
FIG. 2 is a schematic diagram of a portion of the system of FIG. 1 showing in further detail features of the accent and memory compare equal circuits.

Referring to FIGS. 1 and 2, it will be seen that the magnetic drum 46 which is connected in driving relation with shaft 14 which rotates with the chain 10 has a read head 100 which cooperates with a plurality of slots 102 in the core to produce pulses which are amplified by an amplifier 104 and utilized to set a print scan trigger PS. In the present instance, since 96 characters are shown as an example of the number which may be used on the chain 12, 96 slots are utilized, one for each character and for each of the 96 scans to be made of each print position. The home position of the drum 46 is identified by additional slot 105 half-way between the last regular slot and the first slot. The home position is identified by the combination of a pulse from the extra or 97th slot 105 and a delayed pulse from the 96th slot. The leading edge of the PS pulse is fed over line 101 to a single shot SS which produces a pulse longer than one-half the time between typical PS pulses. A home trigger HT is gated by the single shot pulse over line 103. The PS pulse over line 91 goes to the set of the home trigger HT. On any of the PS pulses, the gate and set inputs of the home trigger rise simultaneously, but because the gate of the trigger has a slow rise time, it cannot be set by simultaneous inputs. The single shot pulse has ended by the time the next PS pulse arrives except on the additional or 97th pulse which has a closer drum spacing. Thus on the 97th slot coincidence occurs and the trigger HT is turned on and the home position is thus identified. The home pulse identifies the home or initial character on the chain. Therefore the character 1 is the home character when using a substantially binary code to identify the different characters.

The PS counter identifies the character aligned with the first print position by counting the pulses from the PS trigger. A compare counter 42 is utilized to indicate the character in the next eligible print position. This is accomplished by transferring on each PS pulse the character which is in the PS counter to the compare counter 42. The compare counter 42 is advanced by a clock pulse R0 in conjunction with a print scan signal and the absence of a signal from a PS trigger through an AND 106.

The compare circuit 48 continuously compares the output of the contents of the compare counter 42 with the character in storage for each print position in succession over the input and regeneration line 110, and when an equal condition is encountered, a zero output on line 112 is inverted by the inverter 113 to produce in conjunction with a clock signal W0 and a print scan signal, an output from a memory compare equal AND switch 115. When the character in the PS counter as determined by the OR circuit 116 is anything other than a 1 immediately after the home pulse, this indicates an error, and the output of the OR circuit 116 is utilized to control an AND switch 118 to turn on a home error latch 120 in conjunction with an output from a home pulse stored trigger 122 and an output signal from AND circuit 124 in response to coincidence of a print scan signal and a W1 clock signal.

It will be seen that in addition to furnishing a signal to compare circuit 48 indicative of the character on the chain 10 at a particular print position for comparison with the signal from core storage 20 over lines 110, the compare counter 42 furnishes signals to AND circuits 119 and 121. These signals comprise for example the 1 and K1 bits indicative of an accent 1, and the 2, 8, A and K1 bits indicative of accent 2. The outputs of AND circuits 119 and 121 are fed to compare circuits 47 and 49 together with the accent 1 and accent 2 bits as read out of core planes 19 and 21 over lines 23 and 25 from the inhibit latches in box 36. The compare outputs are fed over lines 17 and 53 to the AND circuit 52 as shown in FIG. 1 as well as to accent control circuits 57 and 59 to effect energization of the print hammer drivers HD to print the accent and also to prevent regeneration of the accent bits in the accent core plane whenever a compare occurs.

Referring again to FIG. 5, it will be seen that the hammer select matrix 54 comprises a plurality of hammer drivers H.D. which are selectively switched by the A and B rings 30 and 28 over lines 130 and 132 in conjunction with a memory compare equal signal over line 55 which gates with the B ring output in AND switches 133. A memory compare equal latch 51 is set by a signal from the memory compare equal switch 115 over line 58 and is reset by clock pulse R0. Thus during a print scan operation, whenever an equal condition is indicated between a character in any one of the storage units 19, 20 or 21 and a character or accent on the print chain 10 for a particular print position, this equal signal results in the energization or firing of the corresponding print hammer driver HD.

Figure 4:
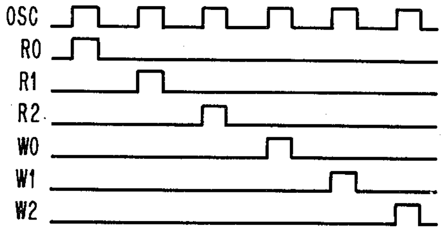
FIG. 4 is a timing chart illustrating the clock timing pulse arrangement.

As shown in FIG. 4, during each cycle of clock pulses the read or R pulses occur before the corresponding write or W pulses. Accordingly, during a print cycle each of the cores 140 in the equal check planes 60 as shown in FIG. 5 is set to a "1" during the read or R portion of the cycle, as in the read portion R0 of the clock cycle, the latch 51 was reset and the inhibit line 142 is now ineffective to oppose the write lines. As described, the occurrence of a memory compare equal signal during the print scan operation results in the setting of the compare equal latch 51 and energizing the inhibit line 142 to set the core to "0" when the equal signal from switch 115 over the line 58 indicates the corresponding print head hammer driver HD should be fired.

Each of the cores in the hammer fire check plane 64 such as the core 144 shown in FIG. 5 is initially set to "0" by the X, Y read lines X″ and Y″ during the R portion of the print cycle. Whenever a particular hammer driver HD is fired to operate its corresponding hammer, a signal is provided over conductor 146 to set the core 144 to "1." Since the switch in core state occurred during the write portion of the clock cycle, this is after the cores have been read and compared. The conditions of the cores 140 and 144 for each print position are therefore compared in succession on the next print scan by compare circuit 70, and since the cores should at all times be in opposite conditions, a compare signal results in an error, and this signal is applied over line 74 through OR circuit 148 to set a print error check latch 150 which results in setting the corresponding core 152 in the print error check error plane 76.

In operation, information for each of the print positions is read into the core storage matrix 20 over the data the input channel 22 under the control of the input and regeneration latches 79 (part of the box 50 of FIG. 1) which are reset by data input and which control the setting of the core 86 in response to energization of the read and write lines under the control of the X and Y drivers write 34 and 35, in response to selection of the particular cores through the X and Y switches 24′ and 26′ under the control of B and A memory rings. As each bit is written into the core storage for successive print positions, a corresponding core 97 in the print line complete core plane 80 is set. The equal check core plane cores 140 are initially set to "1" and the hammer fire check plane core 144 are set to "0" as are the cores 152 of the print error check plane 76 during the R portion of the print cycle.

Whenever an accent code is read over lines 22, the accent decode circuit 27 provides an accent bit over the proper line 41 or 43 to reset latch 93 and permit a "1" to be written into core 78 (FIG. 3). This output is also applied to OR circuit 29 and inverter 31 through AND 61 so that the clock signal alone cannot advance the rings B and A. Accordingly, the immediately following code for the character to be accented is read into the same position in core storage 20 corresponding to the position of its associated accent.

During print scan the A and B rings successively select the different print position cores in main storage 20 and accent storage 19 and 21 simultaneously, the compare counter 42 is advanced by clock pulses and a pulse scan signal successively presents the character on the print chain 10 opposite the print position being scanned. Thus the sequence of events according to clock cycle is as follows:

R0. Compare counter 42 is advanced to the correct character for the next eligible print position. Memory rings A and B are advanced to select the particular X and Y switches 24′ and 26′ for the eligible print positions of accent and character storage and the corresponding print hammer drivers.
Input and regeneration bit register latches 79, 90 and 93 are set.

R1. X and Y read core drivers 38 and 40 interrogate the selected storage positions for read-out.

R2.

W0. Compare circuits 47, 48 and 49 are sampled.

W1. 1 Equal line for the compare circuits 47, 48 and 49 are sampled with the W1 clock pulse at switch 22.
2 The character is rewritten in storage by the regeneration latch 79 being reset during the write portion of the clock cycle and the accent bit is not regenerated or is regenerated depending on whether or not the compare occurred.

W2.

Thus when the core positions are interrogated, the sense amplifiers 66 transfer the character or accent to the input and regeneration latch 79 or 93 and it is available as the complement of the character. The compare counter 42 and the input and regeneration register latches 79 and 93 are compared on the clock cycle W0. This is sampled for an equal and if it is, the memory compare equal latch 51 is set on. At W1 time, the memory compare equal latch 51 is sampled and if a comparison exists, the hammer selected by the memory rings is fired in response to the equal signal over conductor 55.

If an accented character is to be printed, the compare between the accent and character on the chain with the bits in storage must obviously occur at different times, either one ahead of the other, since the accent and character are located at different points on the chain. Accordingly, even if the main character or character segment is printed for a particular print position as hereinbefore described, a later compare with the accent segment on the chain can occur on a subsequent scan operation. When it does, the accent compare signal from accent 1 compare, for example, provides the signals through OR 15 and AND 52 to fire the hammer for the print position, and the previously printed character is now accented, both printing operations combining to provide the final result. Regeneration is prevented by the accent 1 compare signal over line 17 setting inhibit latch 93. It will be realized that printing of the accent can occur first, with the principal character being overprinted in a later print scan.

On an initial read-in to the core memory 20, all cores are set to a "1" on the 14th or print line complete plane 80 by the X and Y write lines if there is a character to be printed in each position. If an ineligible code or nonprintable position or dummy character is to be printed in any position, the core 97 corresponding to that position is set to a "0" state in response to a no-print signal over line 98 which sets latch 90 as shown in FIG. 3. Each time a character is read out and printed the corresponding core 97 in the print line complete plane 80 is reset to "0." If at the end of the 96th scans all the cores in this plane are not in their "0" state, a check of this plane is made in an extra or 97th print scan and all positions of the print line complete plane should be at "0" if all positions have been printed. The output of the print line complete latch 90 is sampled during this extra print scan with the 97th pulse on the print scan counter 44 and at AND switch 108 and an output of this latch during this scan indicates an error and turns on a print error stop latch ES.

Since each of the cores 78 in the accent 1 core plane is reset to a "0" upon a compare, and printing of the accent, an extra scan of this core plane should also result in a "0" output or else an error is indicated. This is true also for the accent 2 core plane.

In the hammer firing check core plane 64, each core 144 is normally in a zero state and when a hammer fires, a pulse over line 146 changes its core to a "1" state. The corresponding core 140 of the equal check core plane is normally in a "1" state and is switched to "0" when a comparison between a stored character and the compare counter exists. Thus an equal or check plane core 140 is switched to "0" when the corresponding hammer driver HD is supposed to fire, and the hammer fire check plane core 144 is switched to a "1" when the hammer driver HD actually does fire. Therefore, if the cores in these two planes ever agree at any point in the memory cycle, it indicates an error and this condition is checked in the next print scan after the cores are switched, and the compare error stop latch 72 is turned on for an equal condition. At this time a core for the position is set to a "1" state in the print error check plane 76 by a pulse over line 74 to reset latch 150, for example, a core 152. When the operation is stopped by the compare error stop latch 72 being turned on, an error address search switch 160 shown in FIG. 1 may be operated to energize an error address search latch 164 which applies a simulated read-in signal over line 166 to the OR circuit 168 for effecting a simulated read-in to cause operation of the clock 32 and the memory rings 28 and 30 in a manner similar to that described for read-in. A signal is also applied over conductor 170 to a single shot 172 shown in FIG. 5 for setting for the print error check latch 150. When the switches 24′ and 26′ select the set core 152 in the print error check plane, the output from the sense amplifier 155 when the set core is read, turns the print error check latch 150 on and the output of the line 156 is inverted by inverter 157 at AND switch 158 to stop the clock 32 and prevent the advance of the rings 28 and 30 to indicate the error position.

From the above description and accompanying drawings, it will be seen there is provided a simple and effective arrangement for forming characters through overprinting by providing separate storage planes for portions or segments of characters to be printed, such as accents which are to be used with a number of different characters. Operation of the chain printer may be effected by overprinting to combine different ones of a plurality of accents with different ones of a plurality of characters. It should be realized that the separation between the accents and the characters with which they are to be printed on the chain should be sufficient so that an attempt is not made to refire the hammer for one print position before the circuitry has reached a stable condition after a first print operation. While the invention has been described in connection with the accenting of characters, it will be realized that it is not necessarily limited to thus; the provision of special characters may be also effected by overprinting so as to use different print segments and provide for repeated operations of the hammers at any of the print positions to provide the desired characters from combinations of the different print segments.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a printer, a plurality of print hammers each at a separate print position and each having operating means for actuating the hammers, a character bearing member continuously moving past said hammers having separate characters and accents thereon at distinctly different locations to be printed by said hammers, separate storage means having one or more planes with different positions for storing representations of a character only, and one or more separate planes with corresponding positons for storing representations of an accent to be printed at each print position, means including a counter for producing an output representation of the character or accent on the character bearing member at a particular print position, compare means connected to the counter and storage means for separately comparing the character and accent representations in corresponding positions of said storage means for each print position with the character or accent on the character bearing member at that position and producing a compare signal upon a coincident compare, and means, including means for simultaneously scanning said character and accent storage means for a plurality of scans, responsive to each coincident compare of a character or accent on separate scans for effecting operation of the hammer operating means for operating the hammer at the particular print position to print one or more times to print either the character alone in one print scan or both the character and accent in the same particular print position on separate scans.

2. In a printer, a plurality of print hammers one at each of a plurality of print positions and each having separate firing means for operating them, a chain bearing a plurality of entirely separate characters and accents at different locations thereon continuously movable past said hammers in seriatim, separate storage means having one or more planes with a plurality of positions for storing representations of said characters, and one or more separate planes with corresponding positions for storing accents for each position having an accented character, counter means for producing signal representations of the character or accent on the chain at a predetermined print position, means for scanning the positions of said storage means and comparing the representations thereof with the representations of said counter means for determining in separate scans coincidence between the representation of a character or accent on the chain with the representation of the character or accent in said storage means for that print position and effecting operation of the firing means twice at the predetermined print position to print both the accent and character at the same print position in separate scans, means operable to regenerate the character or accent representation in the storage means during each scan, and means responsive to a coincident compare between the representations of accents on the chain and in storage for inhibiting operation of the regeneration means for the accent storage means.

3. In a printer, a movable chain bearing at different locations thereon a plurality of entirely separate characters and accents, which accents are in some instances to be printed at the same print position as a character, a plurality of print hammers located one in each of a plurality of print positions past which the chain continuously moves, firing means for actuating the hammers to type a character or accent from the chain, a counter including means having a driven connection with the chain for producing signals representative of the character or accent on the chain at a particular print position, separate storage means each having one or more planes with a plurality of storage positions corresponding to said print positions for representations of characters in one storage means and accents in the other, means including ring means for sequentially scanning said storage positions in both storage means simultaneously to provide during different print scans, for reading out representations of characters and accents, and regenerating the same, and compare means controlled by the ring means for determining coincidence between either a character representation in one storage means or an accent representation in the other storage means for a particular print position with a character or accent representation from the counter of a character or accent on the chain at said position during different print scans and effecting operation of the print hammer for said position in each of said different print scans to print a character at one time and an accent separately at another time in said particular print position and inhibit regeneration of the accent representation when an accent compare occurs.

4. In a printer, a moving element bearing at different locations thereon a plurality of separate characters and accents which accents are to be printed in the same print position with different ones of said characters to provide an accented character, a plurality of hammers each in a different print position past which the moving element moves, firing means for actuating the hammers to separately print a character alone or a character and an accent in the same print position at different times from said moving element as it moves past said print position, storage means having separate planes one with a plurality of character representation storage positions and the other with a plurality of accent representation storage positions, one corresponding to each print position, means including a ring for sequentially making different print scans of the storage means and selecting different ones of the storage positions to load the storage means separately with representations of characters and accents which are arranged in seriatim with the accent representation for an accented character ahead of the representation for the character, means responsive to loading an accent representation in one position for stopping advance of the ring until the corresponding character representation is loaded in the corresponding character representation storage position, a counter for producing signal representations of the character or accent at a particular print position, compare means connected to the counter and storage means responsive to coincidence between either a character or accent representation in storage and a character or accent signal representation of the counter for a given print position for effecting operation of the hammer firing means one or more times for said print position to print either a character alone or both a character and an accent in the same print position on different print scans.

5. A printer having, a moving chain bearing a plurality of distinctly separate characters alone and accents to be printed in combination with different ones of said characters to provide an accented character, a print hammer for each of a plurality of different print positions past which the chain moves said characters and accents, firing means for actuating each hammer to print at separate times a character and accent from the chain at the respective print position, separate storage means, one having storage positions corresponding to each print position for a representation of a character, and another having corresponding positions for a representation of an accent, ring means for simultaneously addressing and making print scans of the character and accent storage means a plurality of times in a print cycle and sequentially selecting different positions of both of the storage means simultaneously for writing in or reading out thereof, means including a plurality of data lines for carrying coded representations of characters and accents for the respective print positions with the accent representation located immediately ahead of its associated character, means responsive to an accent representation on said data lines to stop advance of the ring means so that the corresponding character representation is written into the corresponding position in the character storage, means including a counter for producing signal representations of the character or accent on the chain at a particular print position, separate compare means co-operative with the counter and each of the storage means for detecting coincidence between a character or accent signal representation of the character or accent on the chain at the print position with the representation of the character or accent in storage for said position in different print scans to produce a compare signal to effect operation of the firing means of the hammer twice for said position to print the character and accent in the said print position on said different print scans, means normally responsive to a readout of a character or accent representation to regenerate said character or accent representation in said storage means, means responsive to an accent compare signal in any print position to prevent operation of said regenerating means and inhibit regeneration of said accent representation in the corresponding accent storage position to thus provide a zero in said accent storage position, means applying signals for scanning the different positions of the accent storage means at the end of a print cycle, and means responsive to other than a zero in any position in said storage means for indicating an error condition.

6. In a printer, a continuously moving element having thereon of a plurality of separate different type character segments disposed to be printed at a particular print position in different combinations, a plurality of print hammers one for each of a plurality of print positions arranged to cooperate with said type segments to print a single character segment at the corresponding print position as the element moves thereby, firing means for each of said hammers, separate storage means each having one or more planes with a plurality of corresponding positions for storing in different planes representations of different type segments to be combined in each print position, counter means for producing a signal representation of the type segment on the moving element at a given print position, means including ring means for sequentially scanning the positions of the separate storage means simultaneously to provide a plurality of print scans, and compare means cooperative with the counter means and storage means for determining on different print scans coincidence between the signal from the counter and the type segment representation in one of said storage means for effecting plural operation of the firing means for the hammer of said particular position, once each time a coincidence occurs between the type segment representation of one of the separate storage means and the signal from the counter for said position, for effecting a plurality of operations of a single hammer each in a different print scan to print from each of a plurality of different type character segments in a single print position to provide a combination character composed of the separate segments.

7. In a printer, a print hammer associated with a particular print position in a type line, firing means for said hammer, a type bearing member movable past said print position having a plurality of distinctly separate type elements located thereon at different locations some of which are to be combined to provide a particular type character, separate storage means having corresponding positions for each print position for storing separately representations of the different type elements which are to be combined to provide a character for said print position, counter means providing an output signal representation of the type element on the member at a particular print position, means for repeatedly making different print scans of the separate representations in corresponding positions of the storage means simultaneously to produce output signals indicative of representations of the type elements stored in said print positions, and a plurality of compare means one for each storage means connected to be responsive to coincidence between the signal representation of the counter means at a particular print position and the output signals indicative of the type element representations in corresponding positions of the storage means to effect plural operations of the hammer firing means two or more times to separately print the different type elements for said print position for each such coincidence in separate print scans in the same print position to provide a combinational character.

References Cited by the Examiner

UNITED STATES PATENTS

| | | | |
|---|---|---|---|
| 2,412,777 | 12/46 | Chung-Chinkao | 197—1.1 |
| 2,715,360 | 8/55 | Brown | 101—399 X |
| 2,728,816 | 12/55 | Chung-Chinkao | 197—1.1 X |
| 2,776,618 | 1/57 | Hartley | 101—93 |
| 2,884,852 | 5/59 | Saltz | 101—93 |
| 2,915,967 | 12/59 | Gehring et al. | 101—93 |
| 2,966,113 | 12/60 | Deerfield et al. | 101—93 |
| 3,020,525 | 2/62 | Garrison et al. | 340—172.5 |
| 3,066,601 | 12/62 | Eden | 101—93 |
| 3,079,589 | 2/63 | Mol et al. | 340—172.5 |

WILLIAM B. PENN, *Primary Examiner.*